United States Patent
Beirle et al.

[11] Patent Number: 5,381,933
[45] Date of Patent: Jan. 17, 1995

[54] ROTARY FEEDER FOR GRANULATED BULK MATERIAL

[75] Inventors: Walter Beirle, Ravensburg; Ewald König, Ostrach-Burgweiler, both of Germany

[73] Assignee: Waeschle Maschinenfabrik GmbH, Germany

[21] Appl. No.: 86,153

[22] Filed: Jul. 1, 1993

[30] Foreign Application Priority Data

Aug. 24, 1992 [DE] Germany .............. 4228014

[51] Int. Cl.6 ............................. G01F 11/00
[52] U.S. Cl. ..................... 222/368; 222/345
[58] Field of Search ......... 222/344, 345, 367, 368; 414/219

[56] References Cited

U.S. PATENT DOCUMENTS 3,118,575  1/1964  McCauley ............... 222/368 X
4,823,993  4/1989  Siegel et al. ............ 222/564 X
5,114,053  5/1992  Beirle ..................... 222/368 X
5,129,554  7/1992  Futamura ................ 222/368

Primary Examiner—Andres Kashnikow
Assistant Examiner—Joseph A. Kaufman
Attorney, Agent, or Firm—Henry M. Feiereisen

[57] ABSTRACT

A rotary feeder for jam-free operation over a wide speed range has a housing with a feed inlet provided with a roof-shaped baffle plate which, in the running direction of the rotor, includes double-arrowed stripping edges. Each compartment of the rotor includes two radial partitions which extend beneath the baffle plate and are spaced from each other by the width of the baffle plate to define an initially bulk material free space. This space between the partitions of each compartment is connected via circumferential openings with the respectively lateral areas of the rotor compartment to allow granulate particles to enter the space after traveling along the stripping edges.

9 Claims, 8 Drawing Sheets

ROTARY FEEDER FOR GRANULATED BULK MATERIAL

BACKGROUND OF THE INVENTION

The present invention refers to a rotary feeder for granulated bulk material.

In general, a rotary feeder includes a rotor set in a cylindrical bore of a housing with a feed inlet which ends in a feed inlet cross section and a discharge outlet which communicates with a processing user of the bulk material. The rotor is fixed on a rotor shaft and supports a plurality of radial blades to form a plurality of compartments by which the bulk material is transported from the feed inlet top the discharge outlet.

U.S. Pat. No. 4,823,993 describes a rotary feeder for granulated bulk material, with the feed inlet of the housing including a roof-shaped baffle plate which extends at a right angle to the rotor shaft and subdivides the feed inlet cross section in two equal cross sectional areas so that a sloped cavity is formed in the rotor compartments beneath the roof-shaped baffle plate. In running direction of the rotor, the roof-shaped baffle plate ends at an inclined surface of the feed inlet which extends about two grain diameters above the cylindrical generatrix defined by the rotating, radially outer end faces of the rotor blades and ends in a pre-stripping edge which in accordance with one embodiment as shown in FIG. 8 includes two symmetrical sections. In plan view, these symmetrical sections resemble the V-shaped legs of an arrow pointing in running direction of the rotor. Extending parallel to the pre-stripping edge sections are respective stripping edges which lie in the cylindrical generatrix of the rotor and also resemble the configuration of an arrow in running direction of the rotor.

The pre-stripping edge sections and the stripping edge sections define with the cylindrical generatrix of the rotor an angle which is at least equal to the angle of friction between the bulk material and the material from which the rotor housing is made. In this manner, the fraction of granulate particles which after passing the pre-stripping edge is still retained in the pocket-like recess between the pre-stripping edge and the stripping edge, i.e. outside the generatrix of the rotor, is stripped into the sloped cavity created by the roof-shaped baffle plate within this generatrix. Thus, a shearing of grains of bulk material between the leading edge of the end faces of the rotor blades and the first housing edge being passed by the rotor blades is essentially avoided in the range of the nominal speed of the rotor and a jam-free operation of the rotary feeder is accomplished.

When viewing the sloped cavity at any given location of the rotor compartment, this cavity becomes, however, steadily smaller with increasing approximation to the V-shaped tip of the stripping edge because the cavity becomes increasingly filled with stripped granulate material and the slope conditions become increasingly unfavorable since the V-shaped tip of the stripping edge lies in rotational direction of the rotor noticeably lower than the highest surface line of the housing bore. Practice has also shown that in particular with decreasing speed of the rotor, an essentially jam-free operation could not be ensured any more. Thus, the rotary feeder of this type is only suitable to a limited degree for a dispensing operation requiring a wide range of different speeds.

German Patent No. 4,004,415 discloses a rotary feeder for granulated bulk material which differs from the previously described rotary feeder, at otherwise similar construction of the housing, in the omission of a roof-shaped baffle plate in the feed inlet i.e. at the level of the feed inlet cross section and in that the pre-stripping edge is not of arrowed configuration but extends parallel to the rotor blades. Disposed in the pocket-like recess between the pre-stripping edge and the split stripping edge is a baffle plate or deflector which is essentially of V-shaped configuration, with the tip pointing in opposition to the rotational direction of the rotor. The deflector ends at a distance to the stripping edge sections so as to define a gap of a width which is a multiple of the mean grain diameter.

A rotary feeder of this type ensures in the range of the nominal speed of the rotor a relative jam-free operation only when the filling degree of the compartments remains clearly under 100% in order to provide a sufficient volume for receiving stripped grains. Such conditions are met e.g. at operation with high speed, at pre-dispensed bulk material supply and/or at high counter-pressure and a resulting leakage air flow in opposition to the introduced bulk material.

SUMMARY OF THE INVENTION

It is an object of the present invention to provide an improved rotary feeder of the above mentioned type obviating the aforestated drawbacks.

In particular, it is an object of the present invention to provide an improved rotary feeder which operates in a jam-free manner for a wide range of bulk material types and modes of operations, in particular at dispensing operations over a wide range between the minimum and the maximum dispensing amount per time unit.

These objects and others which will become apparent hereinafter are attained in accordance with the present invention by providing each compartment of the rotor with two radial partitions which extend beneath the baffle plate and are spaced from each other by the width of the baffle plate, with the partitions having outer edges lying in the cylindrical generatrix of the rotor and including an opening in the peripheral area next to the joint with the respectively trailing rotor blade.

Since the area of each rotor compartment beneath the roof-shaped baffle plate is kept free of introduced bulk material, a space of sufficient volume is made available for all operational conditions to receive granulate particles which fall via the openings into the space between the partitions through coaction between the leading edge of the trailing rotor blade of each compartment and the respective groove flanks in direction of the main symmetry plane of the housing. The volume of the space is thus independent from properties of the respective bulk material, such as hardness, grain structure and pourability and the operational conditions of the rotary feeder. Therefore, the rotary feeder can run even from standstill in a jam-free manner.

The volume of the space between the partitions, which may reach up to the shaft of the rotor, should be sufficiently dimensioned to receive a maximum possible number of granulate particles being stripped or displaced in direction of the main symmetry plane of the housing. The maximum number of granulate particles is determined by the volume of the grooves in the inside wall of the cylindrical housing bore. Thus, the volume of the space between the partitions should be at least equal to the volume of the grooves in the inner wall of the housing bore, and is preferably 1.5–2 times that volume, with the width of the baffle plate and the resulting mutual distance between the partitions being accordingly dimensioned.

Similar considerations allow optimization of the positions and the geometric configuration of the openings in the partitions. Suitably, the opening in each partition is defined by a rear edge which lies coplanar with the frontal surface of the adjoining rotor blade. Preferably, the opening has a width in circumferential direction which is at least equal to the width of the grooves projected in the main symmetry plane.

Under certain operational conditions, e.g. at especially high rotor speed, it may be suitable to arrange the section of the rotor blade between the partitions offset in opposition to the rotational direction relative to their openings in order to better take into account the arrow configuration of the grooves in the inner wall of the cylindrical housing bore.

BRIEF DESCRIPTION OF THE DRAWING

The above and other objects, features and advantages of the present invention will now be described in more detail with reference to the accompanying drawing in which.

DETAILED DESCRIPTION OF PREFERRED EMBODIMENTS

Figure 1:
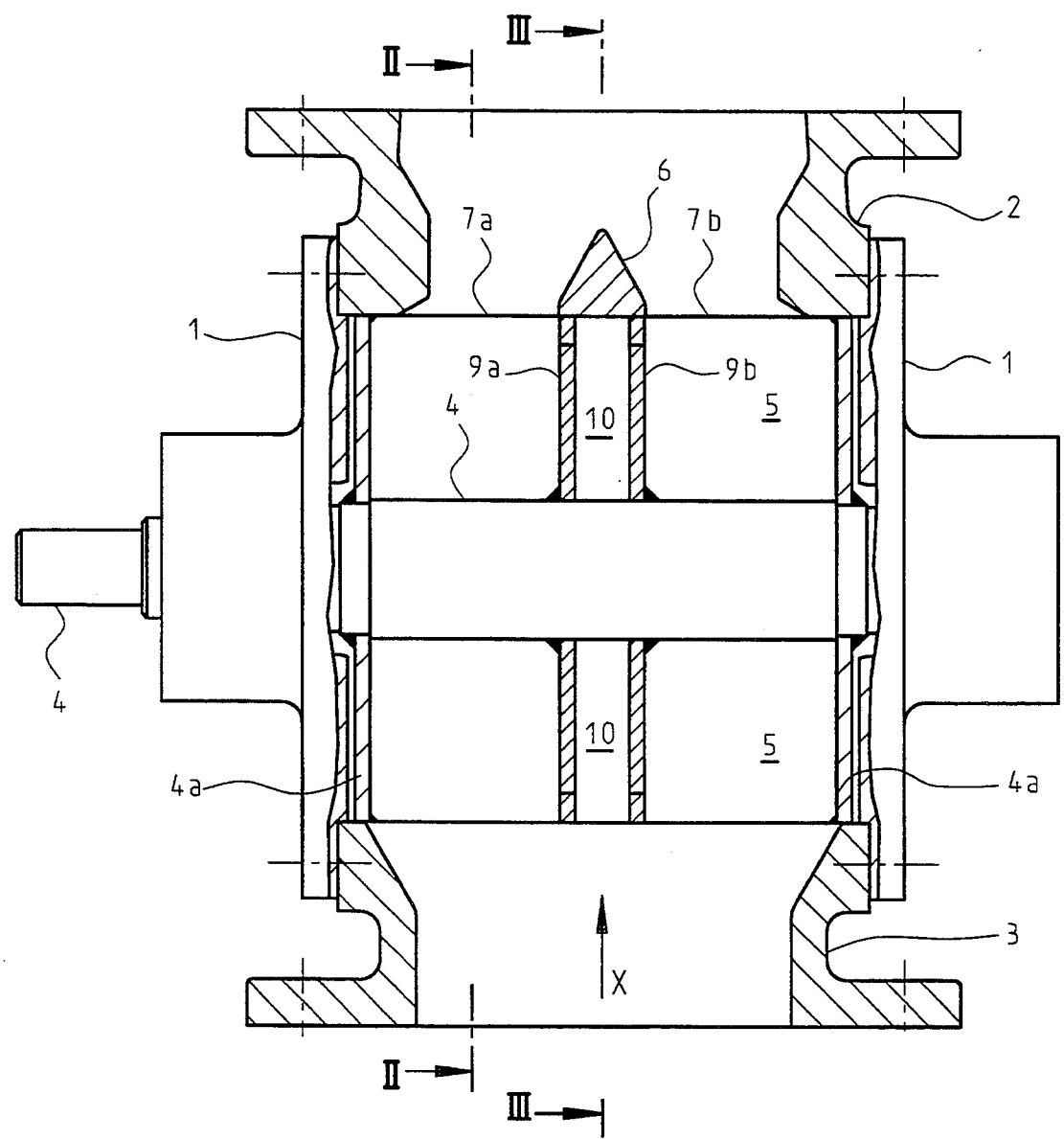
FIG. 1 is a longitudinal section of one embodiment of a rotary feeder in accordance with the present invention.
Figure 2:
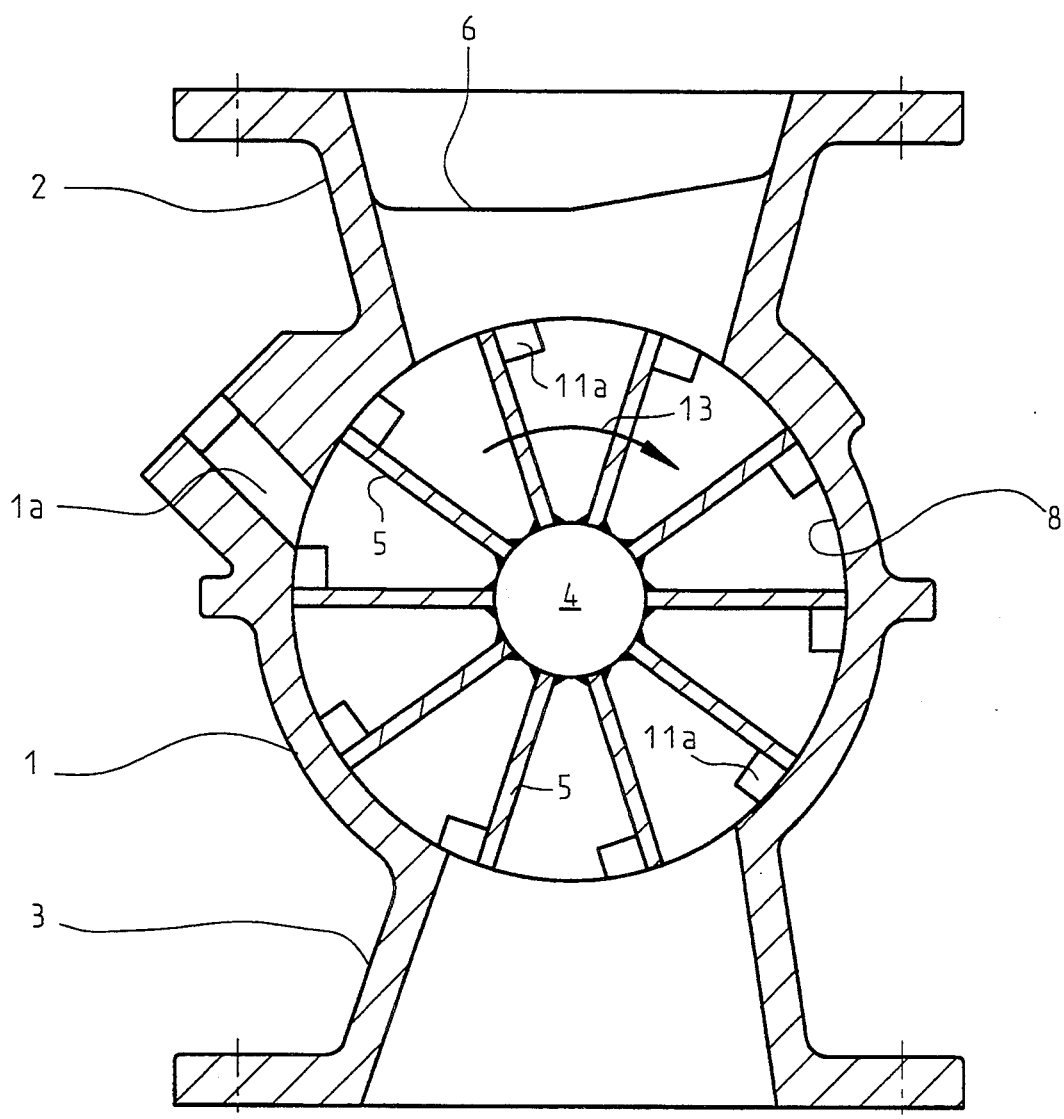
FIG. 2 is a cross sectional view of the rotary feeder, taken along the line II—II in FIG. 1.
Figure 3:
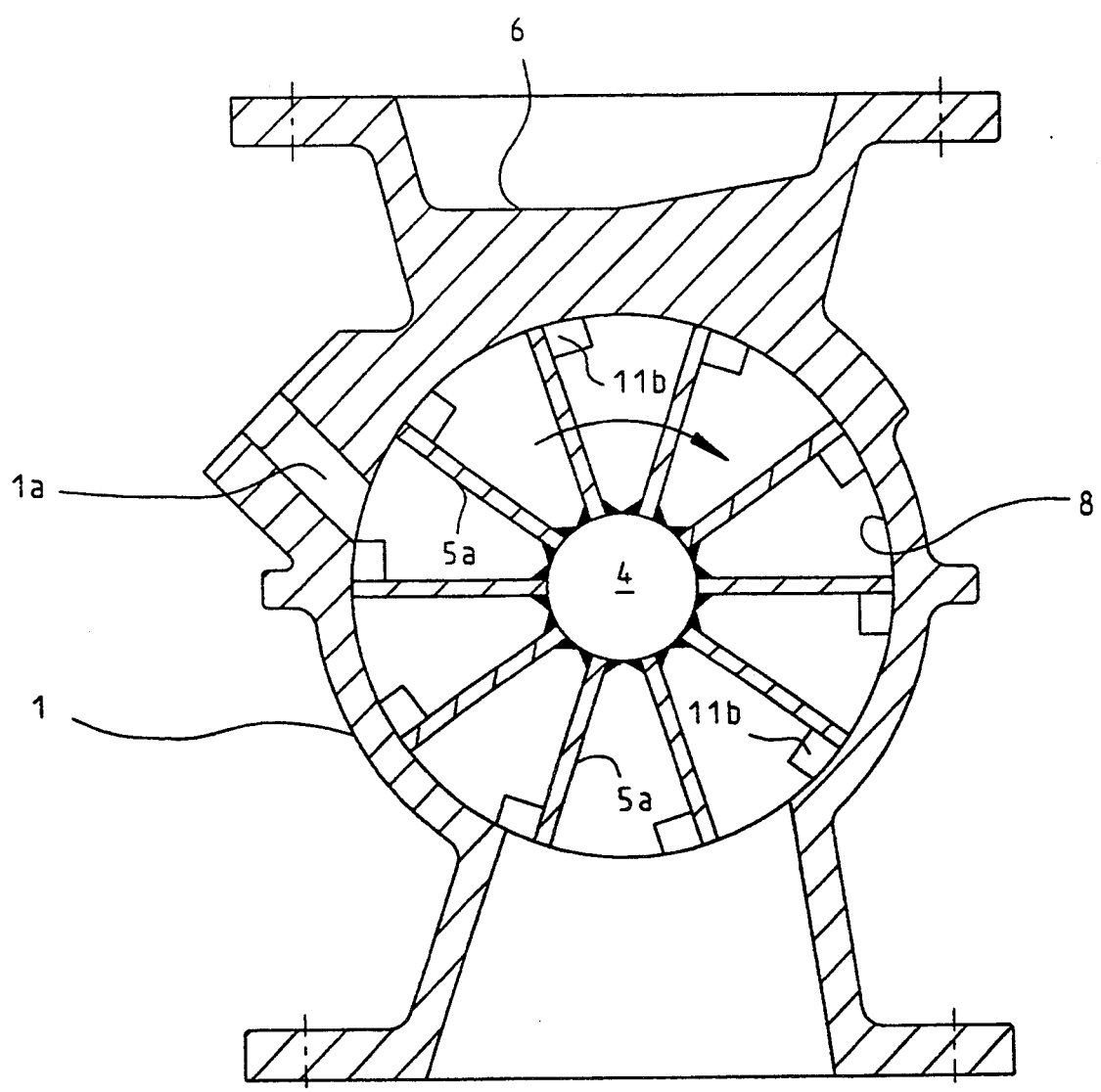
FIG. 3 is a sectional view of the rotary feeder taken along the line III—III in FIG. 2.

Referring now to the drawings, and in particular to FIG. 1, there is shown a longitudinal section of one embodiment of a rotary feeder according to the invention, including a housing 1, represented here only by its bearing covers and including a top feed inlet 2 and a bottom discharge outlet 3. A cellular rotor is arranged in the cylindrical bore of the housing 1 and fixed on a rotor shaft 4 which traverses optional side covers 4a, 4b and is journalled at opposite axial ends in the bearing covers of the housing 1. As shown in FIGS. 2 and 3, the rotor is driven in rotational direction of arrow 13 and includes a plurality of radial rotor blades 5 which are mounted on the shaft 4 so as to define a plurality of compartments.

Persons skilled in the art will understand that the rotor shaft 4 is sealingly supported in the housing bearings and is driven by a motor for rotation in direction of arrow 13. These elements are, however, not shown in the drawing for sake of simplicity.

Suitably, the housing 1 is provided with an optional passageway 1a (FIG. 2) for discharge of leakage gas, and the feed inlet 2 is suitably flanged for allowing connection of the rotary feeder e.g. to the outlet of a source of bulk material, such as a silo (not shown).

Located in the feed inlet 2 is a baffle plate 6 which extends at a right angle to the rotor shaft 4 and has a roof-shaped cross section, as best seen in FIG. 1. The baffle plate 6 divides the feed inlet cross section in two equal cross sectional areas 7a, 7b. As shown in particular in FIGS. 2 or 3, the feed inlet cross section forms part of the cylindrical generatrix of the rotor, which in the area of the housing 1 forms the inner wall of the housing bore.

Each compartment as defined between successive rotor blades 5 is subdivided by two partitions 9a, 9b of sheet metal which extend in radial planes precisely beneath the baffle plate 6 and are spaced from each other by the width of this baffle plate 6 (less the material strength of the partitions). The partitions 9a, 9b thus define an initially bulk material free space 10 which is provided for receiving stripped granulate particles which enter the space 10 via openings 11a, 11b in the peripheral area of the partitions 9a, 9b as will be described hereinafter.

Figure 4:
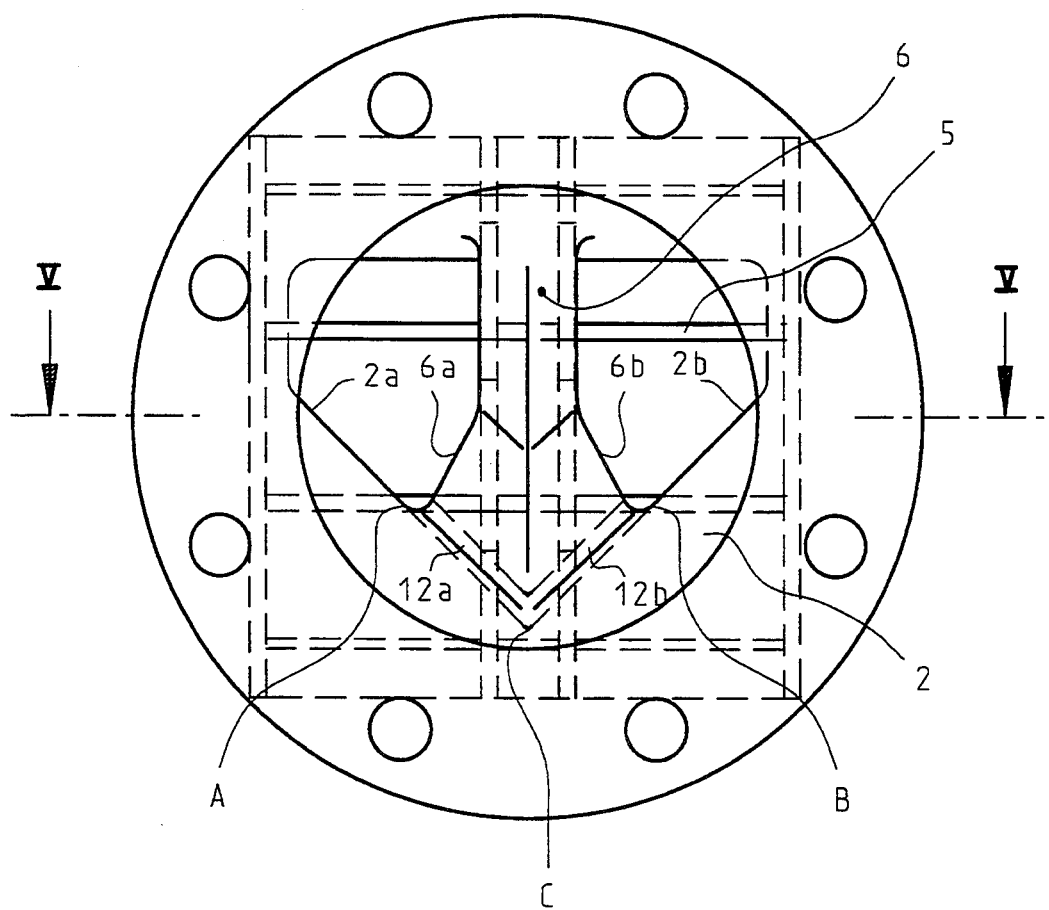
FIG. 4 is a plan view of the rotary feeder according to FIG. 1.

Turning now to FIG. 4, there is shown a plan view of the rotary feeder to illustrate the configuration of the baffle plate 6, and it can be seen that in running direction of the rotor the baffle plate 6 has parallel sides which reach approximately the center of the feed inlet cross section and then expand in two respective lateral sections which serve as stripping edges 6a, 6b. These stripping edges 6a, 6b are continued at points A, B via a small radius by symmetric stripping edge sections 2a, 2b of the feed inlet 2. These stripping edge sections 2a, 2b resemble in plan view the V-shaped legs of an arrow pointing in running direction of the rotor and are continued in the inner wall of the housing bore beneath the baffle plate 6 by grooves 12a, 12b which are about 1.5 times the width and depth of the greatest grain diameter of the granulate material. These grooves 12a, 12b converge in point C which lies on the main symmetry plane of the housing, which plane extends at a right angle to the rotor shaft.

Figure 5:
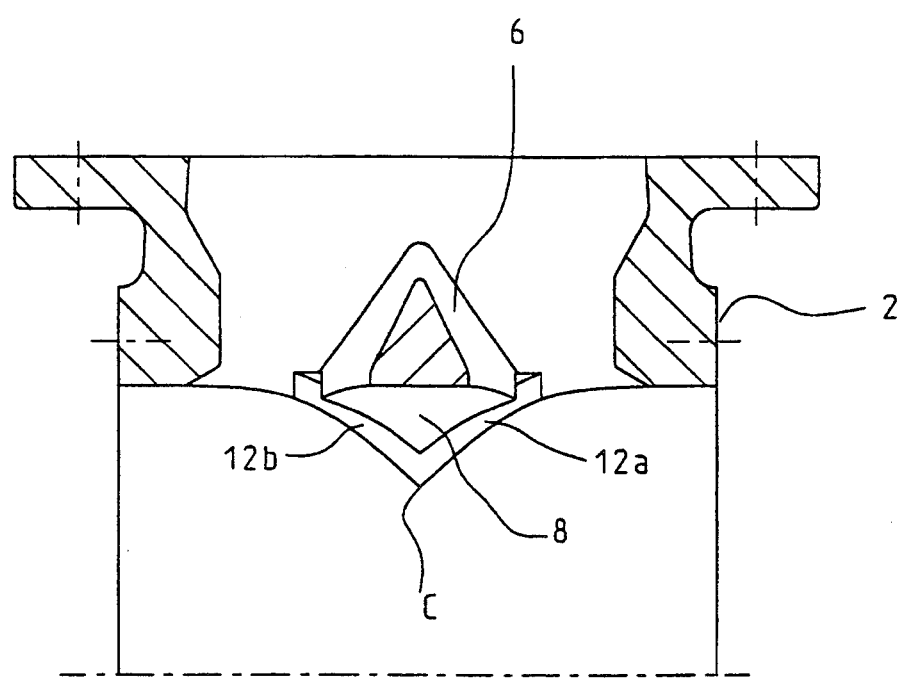
FIG. 5 is a semi-sectional view, taken along the line V—V in FIG. 4 without illustration of the rotor.

FIG. 5, which is a semi-sectional view taken along the line IV—IV in FIG. 4, more clearly illustrates the position and configuration of the grooves 12a, 12b.

The provision of the baffle plate 6 and the grooves 12a, 12b in accordance with the present invention has the following advantages:

When the feed inlet 2 is filled with granulate material beyond the cross sectional surfaces 7a, 7b, granulate material can enter the space 10, and the leading edge of the trailing rotor blade 5 of a rotor compartment entrains some granulate particles while passing the feed inlet cross section. These granulate particles are deflected in dependence on their respective location in the cross sectional area either along the stripping edges 6a, 6b of the baffle 6 or along the respective stripping edge sections 2a, 2b of the feed inlet 2 and carried to the respective apex A, B where the granulate particles enter the respective grooves 12a, 12b. Upon further rotation of the rotor, the nearest openings 11a or 11b in the pertaining partitions 9a, 9b are aligned beneath the grooves 12a, 12b so that the granulate particles fall freely into the space 10 between the partitions 9a, 9b. In general, no granulate particle will reach the apex C where it may theoretically be sheared off between the upper edge of the rotor blade section 5a of the pertaining rotor blade 5, which defines the rear wall of space 10, and the inner wall of the housing bore.

This interaction determines also the optimum dimensioning of the openings 11a, 11b. Preferably, the trailing edge of each opening 11a, 11b, as viewed in running direction of the rotor, should extend coplanar with the leading edge of the respective "trailing" rotor blade 5. Furthermore, the width of the openings 11a, 11b in circumferential direction, should be at least equal to the width of the grooves 12a, 12b projected in the main symmetry plane, as clearly shown in FIG.4. The depth of the openings 11a, 11b in radial direction of the rotor should be at least equal to the greatest grain diameter of the granulate material; however, this depth should not be made too large because otherwise a portion of the space 10 will be filled by bulk material entering laterally from the adjoining compartments.

Figure 9:
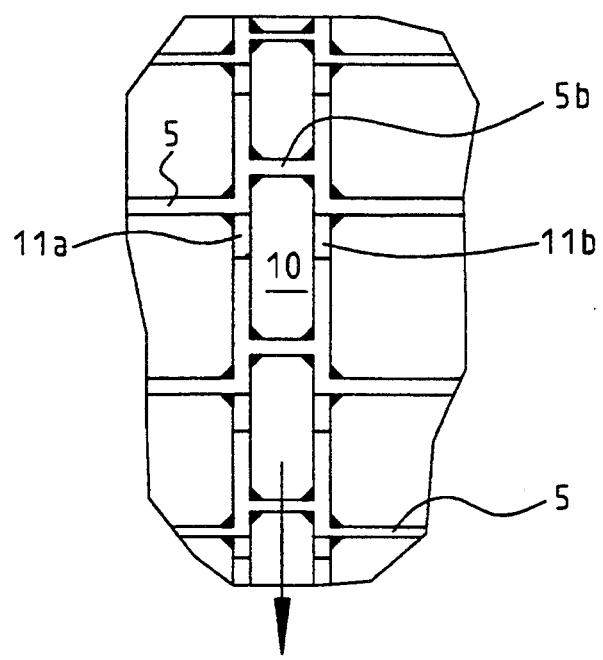
FIG. 9 is a fragmentary bottom view of the rotary feeder of FIG. 7.
Figure 6:
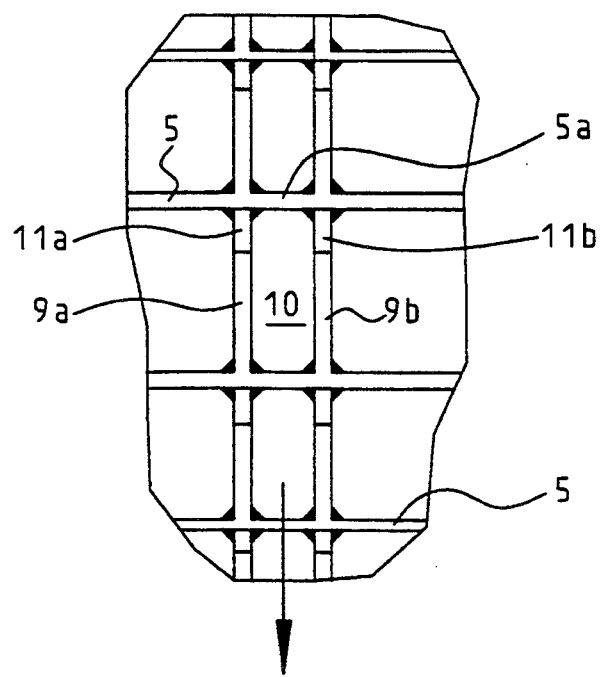
FIG. 6 is a fragmentary bottom view in direction of arrow X in FIG. 1.
Figure 7:
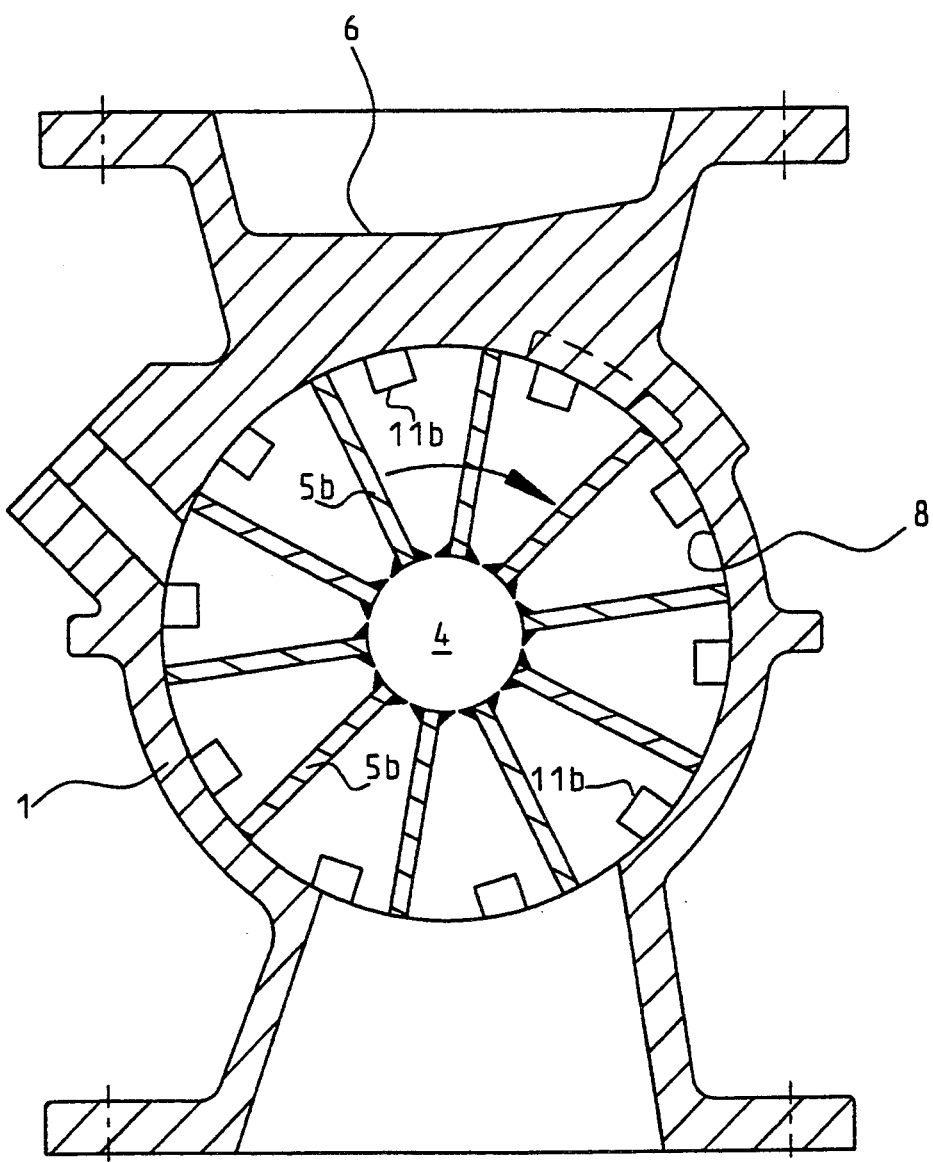
FIG. 7 is a sectional view of a second embodiment of a rotary feeder according to the invention.
Figure 8:
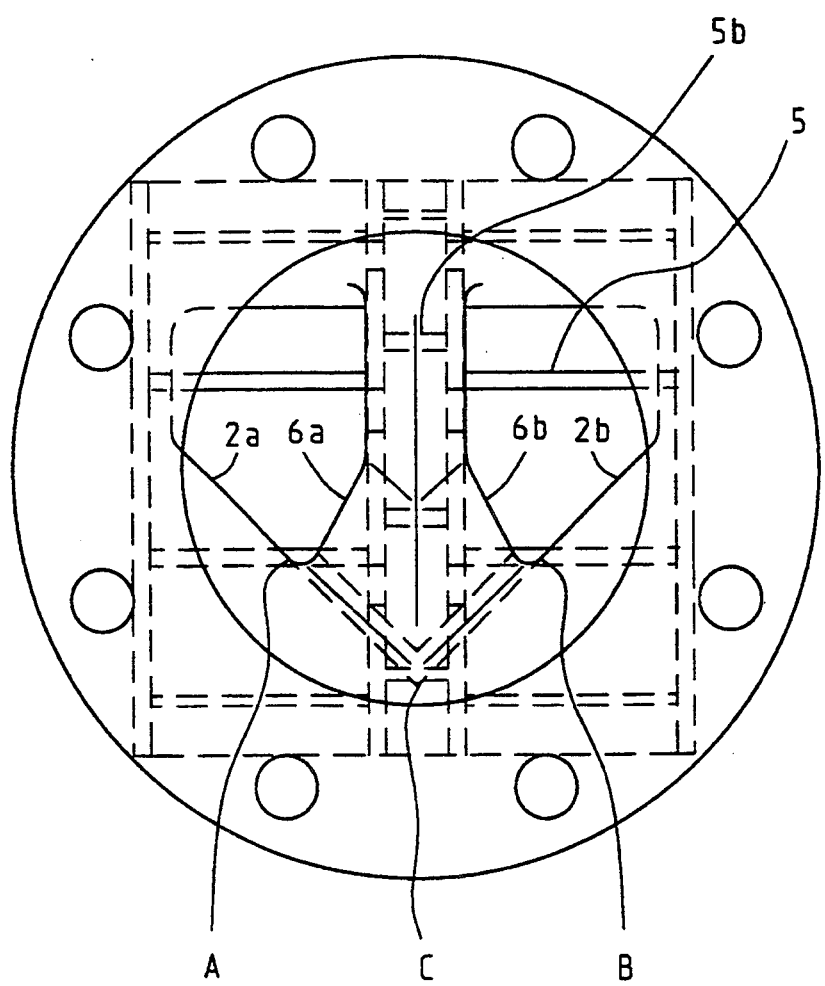
FIG. 8 is a top view of the rotary feeder of FIG. 7.

Turning now to FIG. 7 to 9, there is shown a second embodiment of a rotary feeder according to the present invention, and it can be seen in particular from FIG. 9, that the central rotor blade section 5b, which represents the rear wall of the space 10 between the partitions 9a, 9b, is arranged offset in opposition to the rotational direction of the rotor by about 20% of the width of the compartment, as measured in circumferential direction, less the width of the baffle plate 6. The location of the openings 11a, 11b remains unchanged. The configuration of the rotor blades 5 in this manner is advantageous in particular for use with very high rotor speeds in which the inertia of masses of the granulate particles begins to have an effect so that these granulate particles apparently remain behind the rotation of the blades of the rotor when falling under the influence of gravitational forces.

While the invention has been illustrated and described as embodied in a rotary feeder for granulated bulk material, it is not intended to be limited to the details shown since various modifications and structural changes may be made without departing in any way from the spirit of the present invention.

We claim:

1. A rotary feeder for granulated bulk material, comprising:
    a housing having a cylindrical bore and provided with a feed inlet and a discharge outlet, with said feed inlet being defined by a cross section;
    a rotor accommodated in said housing and including a plurality of radially extending blades mounted on a rotor shaft and defining compartments for transporting bulk material in a running direction from said feed inlet to said discharge outlet; and
    a baffle extending at a right angle to said rotor shaft for dividing said feed inlet cross section in two equal sections, said baffle having parallel sides which expand in an area traversed last by said blades to act as stripping edges which end in symmetric stripping edge sections of said feed inlet which resemble V-shaped legs of an arrow pointing in a running direction of said rotor, each of said stripping edge sections communicating with a groove extending in an inner wall surface of said bore of said housing beneath said baffle and having a width and a depth about 1.5 times the greatest grain diameter of the granular bulk material, said grooves converging in an apex lying in a main symmetry plane through the center of said housing at right angle to said rotor shaft;
    said rotor being provided in each compartment with two partitions extending beneath said baffle between successive blades and spaced from each other by the width of said baffle, said partitions having a peripheral edge lying in the surface of said housing defined by the generatrix of said rotor means, wherein each of said partitions includes an opening in the peripheral area next to its joint to a trailing blade.

2. A rotary feeder as defined in claim 1 wherein said baffle is of roof-shaped cross section.

3. A rotary feeder as defined in claim 1 wherein said partitions are made of sheet metal.

4. A rotary feeder as defined in claim 1 wherein said opening is defined by a rear edge which is coplanar with a frontal surface of the adjoining blade.

5. A rotary feeder as defined in claim 1 wherein said opening has in circumferential direction a width which is at least equal to the width of the grooves projected in the symmetry plane.

6. A rotary feeder as defined in claim 1 wherein said opening has a radial depth of at least the greatest grain diameter of the granulated bulk material.

7. A rotary feeder as defined in claim 1 wherein each of said blades has a central section extending between said spaced partitions and two external sections, said central section being offset in opposition to the running direction of said rotor relative to said external sections by maximal the width of said compartment as defined in circumferential direction, less the width of said baffle.

8. A rotary feeder for granulated bulk material, comprising:
    a housing having a feed inlet defined by a cross section;
    a rotor accommodated in said housing and including a plurality of radially extending blades to define compartments for transporting bulk material in a running direction from said feed inlet; and
    a baffle for dividing said feed inlet cross section in two equal sections, said baffle having parallel sides expanding in an area traversed last by said blades to act as stripping edges which end in symmetric stripping edge sections of said feed inlet, each of said stripping edge sections being continued in said housing by a groove which extends beneath said baffle, with said grooves converging in an apex which lies in a main symmetry plane of said housing at right angle to said rotor shaft;
    said rotor being provided in each compartment with two partitions which extend beneath said baffle between successive blades and are distanced from each other to define a space, each of said partitions including an opening in the peripheral area in immediate proximity to a trailing one of said successive blades to create a communication between said compartment and said space.

9. A rotary feeder for granulated bulk material, comprising:
    a housing having a feed inlet and a discharge outlet;
    a baffle set in said feed inlet for subdividing the cross section of said feed inlet;
    a rotor accommodated in said housing and including a plurality of radially extending blades to define compartments for transporting bulk material in a running direction from said feed inlet to said discharge outlet; and
    partition means arranged in each of said compartments for defining a separated space, said partition means extending between successive blades beneath said baffle and including an opening in the peripheral area in immediate proximity to a trailing one of said successive blades to create a communication between said compartment and said space.

* * * * *